US012540039B2

(12) United States Patent
Rais et al.

(10) Patent No.: US 12,540,039 B2
(45) Date of Patent: Feb. 3, 2026

(54) METHOD FOR CALCULATING BULK MATERIAL FEED RATES OR BULK MATERIAL LOADS OF A VIBRATORY MACHINE

(71) Applicant: SANDVIK ROCK PROCESSING AUSTRALIA PTY LIMITED, NSW (AU)

(72) Inventors: Viktor Rais, Darmstadt (DE); Jan Schäfer, Darmstadt (DE)

(73) Assignee: Sandvik Rock Processing Australia Pty Limited, North Ryde (AU)

( * ) Notice: Subject to any disclaimer, the term of this patent is extended or adjusted under 35 U.S.C. 154(b) by 375 days.

(21) Appl. No.: 18/027,526

(22) PCT Filed: Sep. 1, 2021

(86) PCT No.: PCT/EP2021/074067
§ 371 (c)(1),
(2) Date: Mar. 21, 2023

(87) PCT Pub. No.: WO2022/063532
PCT Pub. Date: Mar. 31, 2022

(65) Prior Publication Data
US 2023/0373729 A1 Nov. 23, 2023

(30) Foreign Application Priority Data
Sep. 25, 2020 (DE) .................. 10 2020 124 997.7

(51) Int. Cl.
B65G 43/02 (2006.01)
B65G 27/32 (2006.01)

(52) U.S. Cl.
CPC ............. *B65G 43/02* (2013.01); *B65G 27/32* (2013.01)

(58) Field of Classification Search
CPC .... G01G 19/387; G01G 19/393; B65G 27/32; B65G 43/02
See application file for complete search history.

(56) References Cited

U.S. PATENT DOCUMENTS 5,341,307 A      8/1994  Myhre et al.
5,677,498 A *   10/1997  Oakes ................... G01G 19/12
                                                         177/136

(Continued)

FOREIGN PATENT DOCUMENTS

CN      109255496 A     1/2019
DE       10301143 A1    7/2004
(Continued)

OTHER PUBLICATIONS

Full machine translation of JP 2011084396.*
(Continued)

*Primary Examiner* — Natalie Huls
(74) *Attorney, Agent, or Firm* — Morgan, Lewis & Bockius LLP

(57) ABSTRACT

In a method for calculating a bulk material conveying rate or a bulk material load of a vibratory conveyor machine, in which method raw measured data from the vibratory conveyor machine are acquired at at least two times with different load states by at least one acceleration, speed or travel sensor and raw measured data are then processed to give at least one vibration data feature from the list: amplitude, frequency and phase, provision is made to create and to store feature datasets consisting of at least one vibration data feature and to create a regression model on the basis thereof. Based on the created regression model and at least one current feature dataset, the current actual load or bulk material conveying rate of a vibratory conveyor machine is then ascertained and displayed.

20 Claims, 1 Drawing Sheet

(56) References Cited

U.S. PATENT DOCUMENTS

| | | | |
|---|---|---|---|
| 2004/0173031 A1 | 9/2004 | Gicza et al. | |
| 2007/0071652 A1* | 3/2007 | Cherng | B01L 3/0289 422/400 |
| 2010/0304010 A1* | 12/2010 | Powell | G01F 1/64 427/8 |
| 2018/0023996 A1* | 1/2018 | Ikeda | B65G 65/32 198/572 |
| 2018/0044116 A1 | 2/2018 | Kawai | |
| 2018/0072118 A1* | 3/2018 | Dudar | B60D 1/248 |
| 2022/0017312 A1* | 1/2022 | Böhm | B65G 47/19 |
| 2022/0042840 A1* | 2/2022 | Singer | G01G 3/125 |
| 2022/0334566 A1* | 10/2022 | Chow | B65G 43/00 |

FOREIGN PATENT DOCUMENTS

| | | | |
|---|---|---|---|
| EP | 1188695 A1 | | 3/2002 |
| JP | H06-316337 A | | 11/1994 |
| JP | H11-193002 A | | 7/1999 |
| JP | 2001-215146 A | | 8/2001 |
| JP | 2011-084396 A | | 4/2011 |
| JP | 2019052013 A | * | 4/2019 |

OTHER PUBLICATIONS

International Search Report (with partial translation) and Written Opinion dated Feb. 22, 2022, issued in corresponding International Patent Application No. PCT/EP2021/074067.
Search Report dated May 5, 2021, issued in corresponding German Patent Application No. 10 2020 124 997.7.
Office Action dated Oct. 21, 2024, issued in corresponding Australian Patent Application No. 2021346763.

* cited by examiner

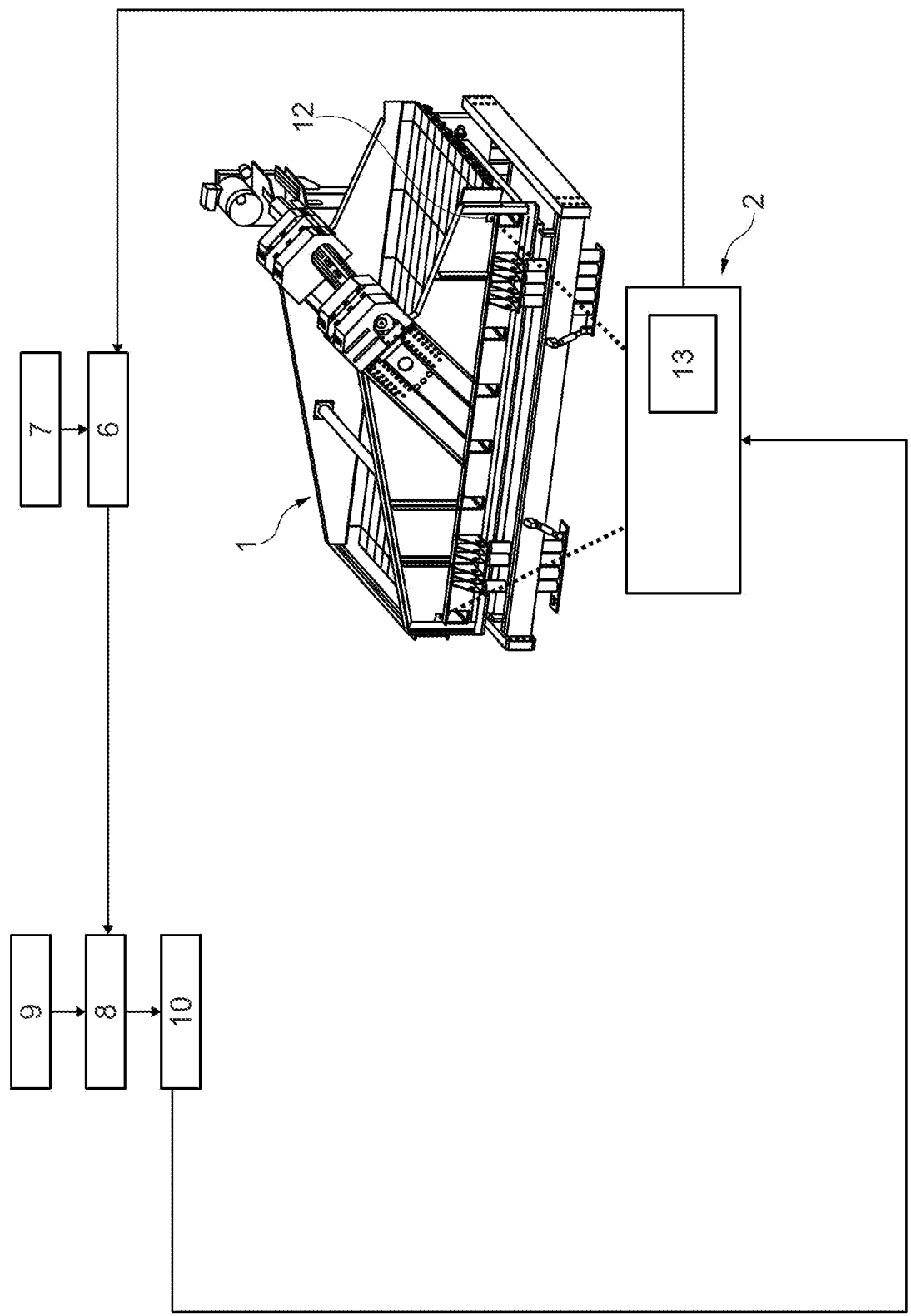

METHOD FOR CALCULATING BULK MATERIAL FEED RATES OR BULK MATERIAL LOADS OF A VIBRATORY MACHINE

The invention relates to a method for calculating bulk material feed rates or bulk material loads of a vibratory machine.

Vibratory machines or vibratory conveyor machines, such as vibratory screens or vibratory conveyors, usually comprise a movable vibratory body, which includes a screening surface or conveyor surface, and a fixed supporting frame, relative to which the movable vibratory body is mounted. Such vibratory machines are used to classify and transport bulk materials, for example, to move them from a stockpile or bunker to a location where the bulk material will be further processed.

To drive or move the vibratory body, magnetic vibration drives or so-called unbalance exciters are used. Unbalance exciters have rotating unbalances or weights that transfer their acceleration forces to the vibratory body in order to cause it to vibrate. Unbalance exciters that cause a directional movement of the vibratory body are called straighteners.

The regulation and/or control of the conveyor capacity or the discharge of a vibratory machine is a task that is not easy to solve due to the many parameters that have to be taken into account, such as drive frequency, vibration amplitude, vibration angle, etc.

Here, the weight measurement of the conveyed quantity is valuable information for the customer in order to be able to determine and control or regulate, respectively, the conveyor capacity of the vibratory machine. In this way, the work potential of the vibratory machine can be fully utilized and overloads can be prevented.

An apparatus and method for adjusting the amount of bulk material on a conveyor trough of a vibrating machine is known, for example, from DE 103 01 143 A1. Therein, a screening machine is supported by four spring elements relative to its support frame. Four weighing bars or load cells are arranged between the spring elements and the support frame as load detectors for determining the loading of the conveyor trough. These load cells are used to continuously determine the actual weight of the vibratory machine and the present load and compare it with a reference value.

It is difficult to measure the weight of the bulk material conveyed because of the oscillating movements, the vibrations of which may lie in the resonance range of the vibratory machine. It is therefore not possible to record the weight by means of load cells or force sensors with applied strain gauges, which generate an electrical signal proportional to the weight on the basis of their deformation.

Another method for controlling the discharge of a vibratory feeder is known from EP 1 188 695 A1. Therein, acceleration sensors are used to measure the vertical acceleration of the vibratory feeder and, in addition, its drive frequency in order to be able to draw conclusions about the actual conveyor capacity from these values.

With this method, however, it is necessary to determine the relationship between vertical acceleration, drive frequency and the corresponding actual conveying capacity, for example in the form of a function, individually empirically or theoretically for each vibratory machine.

It is therefore the object of the present invention to improve and simplify the determination of the bulk material feed rate of a vibratory machine.

This task is solved by a method according to claim 1 and an apparatus according to claim 10. Advantageous embodiments of the invention result from the dependent claims.

The invention provides a method for determining or calculating the bulk material feed rate or bulk material load of a vibratory machine, in which raw measurement data of the vibratory machine are first acquired with at least one acceleration, velocity or displacement sensor.

A vibratory machine in the sense of the invention is understood to mean vibratory conveyor machines such as vibratory screens or vibratory conveyor troughs. While in the case of vibratory screens the material thickness of the bulk material to be conveyed on the screen lining decreases along the conveyor direction as a result of continuous screening, the material thickness in the case of vibratory conveyors remains basically the same. As a result of the change in material thickness, the position of the center of gravity of a vibratory screen also changes. Despite constant drive conditions, such as a stationary impact angle and stationary stator frequency of the motor, the displacement of the center of gravity changes the distance to the impact axis, which in turn results in a change of the "pitching motion". In the course of changing the material thickness and shifting the center of gravity, the amplitude as well as the phase of the longitudinal acceleration thus also change. In addition, the mass of the bulk material load or absolute loading quantity influences, for example, the "resultant stroke" or maximum stroke of the vibratory machine. Furthermore, the load distribution of the bulk material on the loading surface or transport surface influences the "longitudinal stroke" or stroke in the longitudinal direction of the vibratory machine. In contrast, the load distribution of the bulk material does not influence the lateral stroke of the vibratory machine.

Furthermore, there is a correlation between the load and the rotational speed of the rotor or the unbalance exciters, since an increased inertial mass counteracts the centrifugal forces of the exciters and therefore leads to an increased moment of inertia at the drive shaft.

Accordingly, the applicant has determined that no fixed algorithm can be used to determine the bulk material feed rate or bulk material loading of a vibratory machine. Rather, a learning AI algorithm is required to take into account the individual characteristics of a vibratory machine that affect its vibration behavior. Among other things, the mass of the vibratory machine, its geometry, the screen lining and/or specific bulk material characteristics are taken into account.

In order to be able to take into account the individual vibration behavior of a vibrating machine, the raw measurement data are therefore recorded in the method according to the invention—depending on the sensor selected: Acceleration, velocity or displacement are recorded for at least two different loading conditions of the vibratory machine. For example, a measurement at 0% loading may be of interest when there is no bulk material on the vibratory machine and a measurement at 100% loading when the nominal load of the vibratory machine has been reached. These raw measurement data are processed by means of an electronic evaluation unit in a calculation process into at least one characteristic from the list: Amplitude, frequency, phase processed.

Afterwards, so-called feature data sets are created from the features obtained in this way. These feature data sets can consist of only one or a number of features from the list: Amplitude, frequency and/or phase. These feature data sets or vibration signals are stored and are thus available for subsequent evaluation.

Here it is important that the feature data sets resulting from a vibratory machine A are also only used for evaluations concerning the same vibratory machine A.

Investigations of the applicant have shown that the raw measurement data or accordingly the feature data sets or vibration signals interact with the loading quantity of the vibratory machine. Therefore, in the method according to the invention, those indicators are obtained or filtered out from the feature data sets or vibration signals which have a high correlation with a reference signal of the bulk material conveyor quantity or bulk material loading.

A classification model or regression model is then created and/or trained based on the stored feature data sets, each of which shows the correlation of loading and vibration behavior. In the classification model or regression model, the indicators obtained from the feature data sets are assumed as input variables and a corresponding load information—for example, 0% and 100% load—or a reference signal as response variable.

If only 0-100% load information is used as a response variable, the regression model can estimate/calculate an absolute load at least in %. Also, this information is already valuable to detect overload or underload of a vibratory machine.

According to the invention, a reference signal or reference load signal can serve as a reaction variable. This reference signal can, for example, be a force measurement signal or a motor current signal resulting from an upstream, alternative or indirect measurement process of the bulk material feed rate or bulk material load. For example, the reference load signal can be obtained by previously weighing the bulk material by means of a hopper scale or a gravimetric metering device. Alternatively, a feature of the acceleration, velocity, displacement sensor itself can be used as the reference signal.

By means of the method according to the invention, a multivariant classification model or regression model is generated, which takes into account the indicators of the feature datasets in linear and/or nonlinear form and, if necessary, including coefficients.

Based on the regression model, due to a large amount of common variance between two variables and the knowledge of one measured value or reference value, the prediction of another measured value is possible.

Subsequently, the classification model or regression model obtained in this way can be implemented in an electronic evaluation device in such a way that the actual loading quantity of the vibratory machine can be determined and/or displayed on the basis of currently measured raw measurement data or vibration data.

One embodiment of the method provides that the step "creating the classification or regression model" is repeated after a period of time $\Delta t$, after the occurrence of wear on the vibratory conveyor machine, after maintenance measures and/or after other system changes such as changes in the load, the machine components, the drive properties or material properties. This ensures that the regression model created can be continuously adapted to changed boundary conditions. Often, a change in the vibration behavior of a vibratory machine or vibratory conveyor resulting from wear or other changed conditions is not immediately apparent. By repeating the measurements and training the created regression model—for example by adjusting the input variables—it can be ensured that the determination of the bulk material feed rate or bulk material load is correct despite system changes.

An AI algorithm can be used to build the regression model, which is weakly adaptive to adapt to individual machine characteristics. The regression model in the form of a mathematical equation itself represents a working algorithm. An advantageous embodiment of the method according to the invention also provides that only input variables that have a high correlation to the reference signal or reference load signal of the bulk material feed rate or bulk material load are used for creating the regression model. Here, a correlation calculation is used to determine which input variables are suitable for the regression model.

One embodiment of the method according to the invention provides that the regression model uses variables in the form $C1*X1+C2*X2+C3*X2^2 \ldots CN*Xn^n$, where the input variables X are considered based on the feature data sets as linear or nonlinear factors and/or using coefficients $C1, C2, \ldots ; CN \geq 0$.

In order to validate the method according to the invention, the regression model can advantageously be checked using feature data sets that were not used in the creation of the model. Historical data sets or feature data sets are thus divided into training and validation data sets.

For determining and displaying the bulk material conveyor quantity or a bulk material load of a vibratory conveyor machine, the invention also provides a device which is suitable for acquiring raw measurement data of the vibratory conveyor machine by means of at least one acceleration sensor, velocity sensor or displacement sensor. Furthermore, this device provides an electronic evaluation unit with which the raw measurement data is converted into at least one feature consisting of a direction-related vibration measurement variable from the list: Amplitude, frequency, phase, are processed.

In addition, the evaluation device is used to create feature sets consisting of at least one feature and subsequently to create a regression model based on these feature data sets. The device also has a display or a display that shows the bulk material load or bulk material conveyor quantity of the vibratory conveyor machine based on the created model.

As described above, the determination of the bulk material load or bulk material conveying quantity of a vibratory machine or vibratory conveyor machine is a challenge, since both the bulk material quantity on the vibratory machine and the characteristics of the vibratory machine can change continuously. Nevertheless, the bulk material loading or bulk material conveyor quantity represents valuable information. In addition to its function as a performance indicator for the vibratory machine, it also allows conclusions to be drawn about a possible machine overload, which influences the service life of the vibratory machine. In contrast, a persistently low bulk material feed rate can indicate a non-efficient system utilization. Accordingly, the method according to the invention offers the advantage over the already known methods that the actual vibration behavior of the vibratory machine is taken into account. Thus, on the one hand, the underlying regression model can be continuously adjusted, but also—if adjustments of the regression model or algorithm become necessary—malfunctions in the vibration behavior can be detected.

The process according to the invention is explained in more detail below by means of a process diagram, and further features and advantages of the invention are disclosed.

FIG. 1 shows a schematic representation of the operations of the process according to the invention.

FIG. 1 schematically shows the method according to the invention for calculating the bulk material feed rate of a vibratory machine 1 in the form of a vibratory screen. At least one sensor 12 is attached to the vibratory machine 1, which is in data connection with a computing unit of an evaluation device 2. The data connection, which is shown dashed in the FIGURE, can be made via a radio connection or wired connection, via a permanent or temporary connection. The measurement data supplied by the sensor 12 are processed and stored in the computing unit to form feature data sets 13. A regression model 6 is formed from the feature data sets 13, which serve as input variables, and reference signals 7, which originate from an upstream or separate measurement process of the bulk material load. The regression model 6 based on the feature data sets 13 is validated and trained with feature data sets 9 that did not serve to create the model.

The validated regression model 8 is then transferred to a software 10 and transferred to the evaluation device 2 to display the calculation of the bulk material load.

The invention claimed is:

1. A method for calculating a bulk material feed rate or a bulk material loading of a vibratory conveyor machine, comprising:
   a) acquiring raw measurement data of the vibratory conveyor machine with at least one acceleration, velocity or displacement sensor at at least two points in time with different loading states,
   b) processing the raw measurement data into at least one vibration data feature from the list: Amplitude, frequency, phase,
   c) creating and storing feature data sets consisting of at least one vibration data feature,
   d) creating a regression model using feature datasets, wherein for training of the regression model, model-based bulk material loading values are matched with a reference signal or reference load signal of a bulk material conveyor quantity or bulk material loading,
   e) determining and displaying a current actual load of the vibratory conveyor machine based on the created regression model and at least one current feature data set, and
   f) dynamically controlling at least one of a conveyor capacity, discharge of a bulk material, and one or more vibratory parameters of the vibratory conveyor machine based on the current actual load.

2. The method according to claim 1, wherein the step d) of creating the regression model is repeated after a period of time $\Delta t$, after an occurrence of wear on the vibratory conveyor machine, after maintenance measures, or after a system change.

3. The method according to claim 2, wherein the step a) of acquiring raw measurement data is carried out at least at 0% bulk material loading and 100% nominal load bulk material loading.

4. The method according to claim 2, wherein the system change includes a change of loading, a change of one or more machine components, a change of one or more drive properties, or a change of one or more material properties.

5. The method according to claim 1, wherein the reference load signal or reference signal is a force measurement signal or a motor current signal resulting from an upstream, alternative or indirect measurement process of the bulk material feed rate or bulk material load.

6. The method according to claim 5, wherein for training of the regression model only forecasting variables are used whose model-based bulk material loading value has a high correlation to the reference load signal of the bulk material conveyor quantity or bulk material loading.

7. The method according to claim 1, wherein a multivariate regression method is used for training of the regression model.

8. The method according to claim 7, wherein the regression model is created in the form $C1*X1+C2*X2+C3*X2^2 \ldots CN*Xn^n=$bulk loading, wherein the forecasting variables X are considered as linear or nonlinear factors and/or by using coefficients $C1, C2, \ldots ; CN \geq 0$.

9. The method according to claim 1, wherein the regression model is validated using feature data sets that have not been used for training the regression model.

10. The method according to claim 1, wherein the step a) of acquiring raw measurement data is carried out at least at 0% bulk material loading and 100% nominal load bulk material loading.

11. The method according to claim 1, wherein for training of the regression model only forecasting variables are used whose model-based bulk material loading value has a high correlation to the reference load signal of the bulk material conveyor quantity or bulk material loading.

12. A device for determination of a bulk material conveyor quantity or a bulk material load of a vibratory conveyor machine, comprising:
   at least one acceleration sensor, velocity sensor or route sensor arranged to acquire raw measurement data of the vibratory conveyor machine,
   an electronic evaluation unit for:
      processing the raw measurement data into at least one feature consisting of a directional vibration measurand from the list: Amplitude, frequency, and phase
      creating feature sets consisting of at least the one feature,
      creating a regression model using feature datasets, wherein for training of the regression model, model-based bulk material loading values are matched with a reference signal or reference load signal of a bulk material conveyor quantity or bulk material loading,
      determining at least one of a model-based bulk material load value and a model-based bulk material feed rate, and
      dynamically controlling at least one of a conveyor capacity, discharge of a bulk material, and one or more vibratory parameters of the vibratory conveyor machine based on at least one of the model-based bulk material load value and the model-based bulk material feed rate, and
   a screen or a display showing the at least one of the model-based bulk material load value and the model-based bulk material feed rate of the vibratory conveyor machine.

13. The device according to claim 12, wherein creating the regression model is repeated after a period of time $\Delta t$, after an occurrence of wear on the vibratory conveyor machine, after maintenance measures, or after a system change.

14. The device according to claim 12, wherein the reference load signal or reference signal is a force measurement signal or a motor current signal resulting from an upstream, alternative or indirect measurement process of the at least one of the bulk material feed rate and the bulk material load.

15. The device according to claim 12, wherein a multivariate regression method is used in a training phase of the regression model.

16. The device according to claim 15, wherein the regression model is created in a form, $C1*X1+C2*X2+C3*X2^2 \ldots CN*Xn^n=$bulk loading, wherein the forecasting variables X are considered as linear or nonlinear factors and/or by using coefficients C1, C2, . . . ; CN≥0.

17. A method, comprising:
- acquiring raw measurement data of a vibratory conveyor machine with at least one acceleration, velocity or displacement sensor at at least two points in time with different loading states,
- processing the raw measurement data into at least one vibration data feature from a list: Amplitude, frequency, phase,
- creating and storing feature data sets consisting of including at least one vibration data feature,
- creating a regression model using feature datasets, wherein the regression model is validated using feature data sets that have not been used for training the regression model,
- determining and displaying a current actual load of the vibratory conveyor machine based on the created regression model and at least one current feature data set, and
- dynamically controlling at least one of a conveyor capacity, discharge of a bulk material, and one or more vibratory parameters of the vibratory conveyor machine based on the current actual load.

18. The method according to claim 1, further comprising:
based on the current actual load, determining performance information of the vibratory conveyor machine during operation.

19. The method according to claim 18, wherein the performance information includes efficiency information.

20. The method of claim 18, wherein determining performance information further includes identifying one of an overload condition and an underload condition.

\* \* \* \* \*